Figures 1, 2, 3:
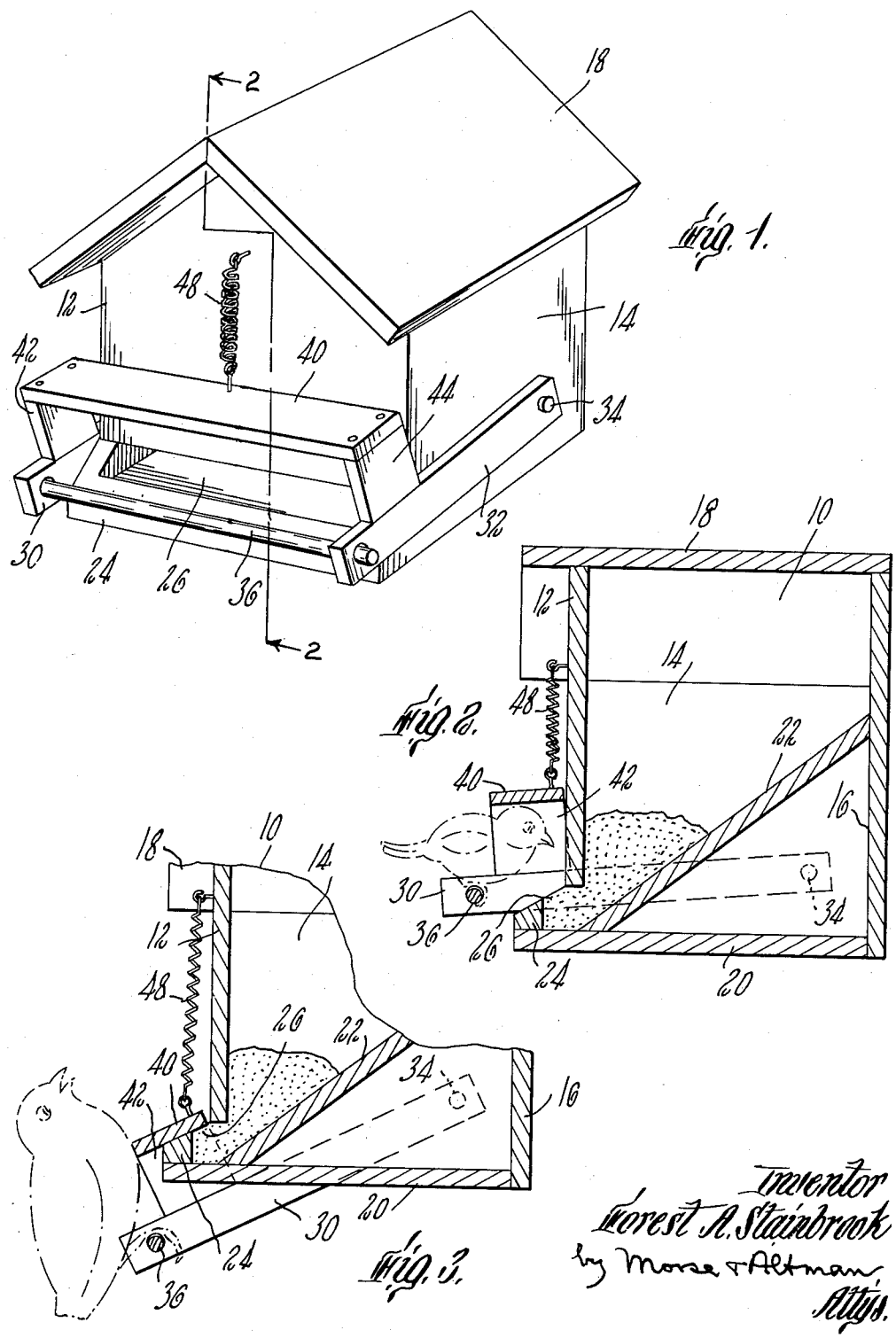

March 10, 1964 F. A. STAINBROOK 3,124,103
BIRD FEEDER
Filed Dec. 7, 1961

Inventor
Forest A. Stainbrook
by Morse & Altman
Attys.

United States Patent Office 3,124,103
Patented Mar. 10, 1964

3,124,103
BIRD FEEDER
Forest A. Stainbrook, 4 Angus Way, Centerville, Mass.
Filed Dec. 7, 1961, Ser. No. 157,733
1 Claim. (Cl. 119—51)

This invention relates to a bird feeder designed to offer a supply of food in such a way as to be accessible by small birds but not by larger birds. In winter time when the birds have difficulty in finding sufficient food many people put out supplies of grain or other bird food for the smaller birds such as chicadees, but unless precautions are taken, the food is apt to be taken by blue-jays, grackles, crows, or other birds of that size which are aggressive and when present drive the smaller birds away.

According to the present invention, a supply of food can be made accessible to the small birds but not to the larger birds. For this purpose a suitable container is provided with an opening near the bottom to expose some of the supply of feed within. A perch is yieldingly mounted in a convenient position to support a small bird close to the supply opening. If a large bird lights on the perch, it yields downward, a cover member moves upon the opening to close it and also knocks the larger bird off balance. The perch can not only yield downwardly but can also rotate about its axis if a moderate turning force is applied. When a bird on the perch is knocked off its balance and still clings to the perch, the action of gravity on the bird provides sufficient torque to turn the perch so that the bird must then either let go or hang upside down.

For a more complete understanding of the invention, reference may be had to the following description thereof, and to the drawing, of which FIGURE 1 is a perspective view of a feeder embodying the invention;

FIGURE 2 is a sectional view of the same on the line 2—2 of FIGURE 1 and on a larger scale; and FIGURE 3 is a partial sectional view similar to FIGURE 2 but showing the moving parts in a different position.

The bird feeder illustrated on the drawing comprises a hopper 10 which may have the external appearance of a small rectangular building with a front wall 12, side walls 14, a rear wall 16, a gable roof 18, and a bottom 20. Within this enclosed structure is a false floor 22 which slopes downward and forward so that feed in the hopper is maintained at the forward end of the building. The bottom 20 and the lower portions of the side walls 14 project forward beyond the front wall 12 to form with a front rail 24 and the lower portion of the false floor 22 a trough which opens upward as at 26, the bottom edge of the front wall 12 being spaced above the floor 22 so that feed in the feeder slides into the trough and is exposed through the opening 26.

A perch and cover assembly is mounted on the outside of the hopper and consists of a pair of parallel arms 30, 32 which are pivoted at their rear ends to the side walls of the hopper, as at 34. These arms extend forward beyond the front of the hopper, their forward ends carrying a perch 36 which is preferably a cylindrical wooden rod arranged parallel to the front wall of the hopper and conveniently spaced from the feed opening 26. The perch 36 is preferably rotatable about its axis but not too freely, rotation being opposed by a moderate frictional resistance.

Parallel to the perch 36 and at a higher level is a cover member 40 carried by the arms 30, 32 and connected thereto by spacers 42, 44. The cover member is preferably a strip of wood or other convenient material long enough to extend from the arm 30 to the arm 32, and wide enough to close the opening 26. The perch and cover assembly is arranged to rock as a unit about the axis of the pivots 34 from a raised position as shown in FIGURE 2 to a lowered position as shown in FIGURE 3. Suitable resilient means such as a spring 48 from the cover 40 to a point on the front wall 12 are employed to hold the assembly in its normal elevated position in which the perch is located in front of and at a convenient distance from the opening 26, and the cover is spaced well above the opening so that the feed in the trough is accessible. The cover 40 preferably slopes forward and downward to serve as a partial shelter for the opening 26.

The strength of the spring 48 is carefully selected to be sufficient to hold up the weight of the perch and cover assembly and also that of a small bird on the perch. A small bird can therefore light on the perch and get at the feed in the trough. If, however, a larger and heavier bird lights on the perch, the spring 48 yields and the perch and cover assembly swings downward to the lowered position illustrated in FIGURE 3. The cover moves down on the opening 26 and effectively closes it. Furthermore, the arc of swing of the cover is such that the front edge of the cover 40 moves forward from a position above and to the rear of the perch 36 to a position above and forward of the perch, as shown in FIGURE 3. Thus a bird on the perch heavy enough to cause the assembly to swing down is knocked off balance by the front edge of the cover 40. Since the perch is rotatable about its axis, the bird will swing down to an inverted position under the perch unless it lets go. In either case it cannot get at the feed. When the perch is relieved of the weight of the bird, the spring 48 restores the assembly to its normal position.

I claim:

A bird feeder comprising an enclosed hopper with front, rear and side walls, said hopper having an upwardly facing trough projecting forward from the bottom of the front wall and communicating with the interior of the hopper to receive feed therefrom, a frame rotatably mounted on said hopper, said frame comprising two parallel arms pivotally attached at one end to respective side walls of the hopper and projecting forward beyond said trough, a perch extending between the forward end portions of said arms and normally located near the front of said trough, a cover member mounted on said arms and extending horizontally above said trough and normally spaced therefrom, and spring means resiliently supporting said frame in its normal position.

References Cited in the file of this patent

UNITED STATES PATENTS

| | | |
|---|---|---|
| 2,918,901 | Poulsen | Dec. 29, 1959 |
| 2,965,070 | Myrick | Dec. 20, 1960 |

FOREIGN PATENTS

| | | |
|---|---|---|
| 157,822 | Sweden | Feb. 12, 1957 |